United States Patent [19]

Fredrickson

[11] 4,356,849
[45] Nov. 2, 1982

[54] MOLDING CURVATURE TEMPLATE FIXTURE

[76] Inventor: Donald L. Fredrickson, 410 S. High St., Aberdeen, S. Dak. 57401

[21] Appl. No.: 147,877

[22] Filed: May 8, 1980

[51] Int. Cl.³ .............................................. B27C 5/10
[52] U.S. Cl. .............................. 144/144 R; 33/174 G; 409/130
[58] Field of Search ........... 144/27, 85, 134 R, 134 A, 144/134 D, 136 C, 137, 144 R, 144.5; 33/174 G, 97, 98, 102, 103; 409/125, 130, 182

[56] References Cited

U.S. PATENT DOCUMENTS

| | | | |
|---|---|---|---|
| 2,726,690 | 12/1955 | Schacher | 144/137 |
| 3,109,466 | 11/1963 | Jones | 144/144 R X |
| 3,199,556 | 8/1965 | Wing | 144/144.5 X |
| 3,442,309 | 5/1969 | Jentsch | 144/144 R X |
| 3,450,001 | 6/1969 | Fortune | 144/136 R X |
| 3,671,369 | 6/1972 | Kualheim et al. | |
| 3,789,892 | 2/1974 | Converse et al. | 144/144.5 |
| 3,878,875 | 4/1975 | McCord, Jr. | 144/87 |
| 4,062,123 | 12/1977 | Lundquist | 144/144.5 X |
| 4,074,736 | 2/1978 | Wolff | 144/144.5 X |
| 4,168,730 | 9/1979 | Keller | 144/144 R X |

Primary Examiner—W. D. Bray
Attorney, Agent, or Firm—Merchant, Gould, Smith, Edell, Welter & Schmidt

[57] ABSTRACT

A molding curvature template fixture is disclosed. The fixture (10) holds a strip of molding (16) and provides a template for a portable router to follow to shape an end of the strip of molding substantially similar to the cross-sectional shape of the shaped side of the molding (16). The molding (16) can then fit over the shaped side of an adjacent, perpendicularly-disposed strip to form a right angle joint. The fixture (10) is comprised of a box-section frame (12) having a series of lateral slots (26, 28, 30, 32, 34) and a clamping mechanism (14). Each slot (26, 28, 30, 32, 34) includes a guiding surface having a shape substantially similar to the cross-sectional shape of the shaped side of a strip of molding (16). An insert (50) may be attached to frame (12) to provide a guiding surface for cutting molding having a non-standard shape.

15 Claims, 8 Drawing Figures

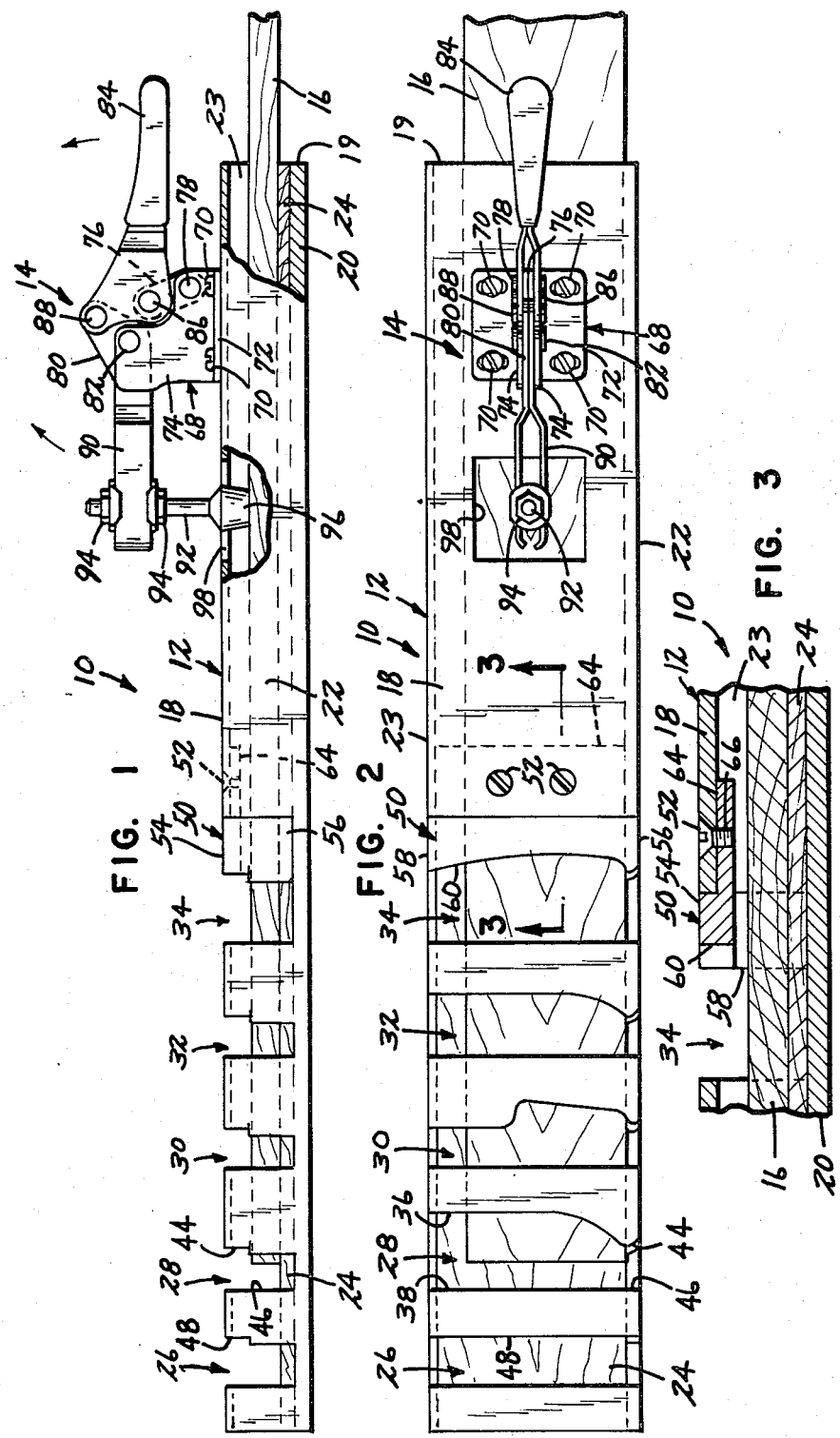

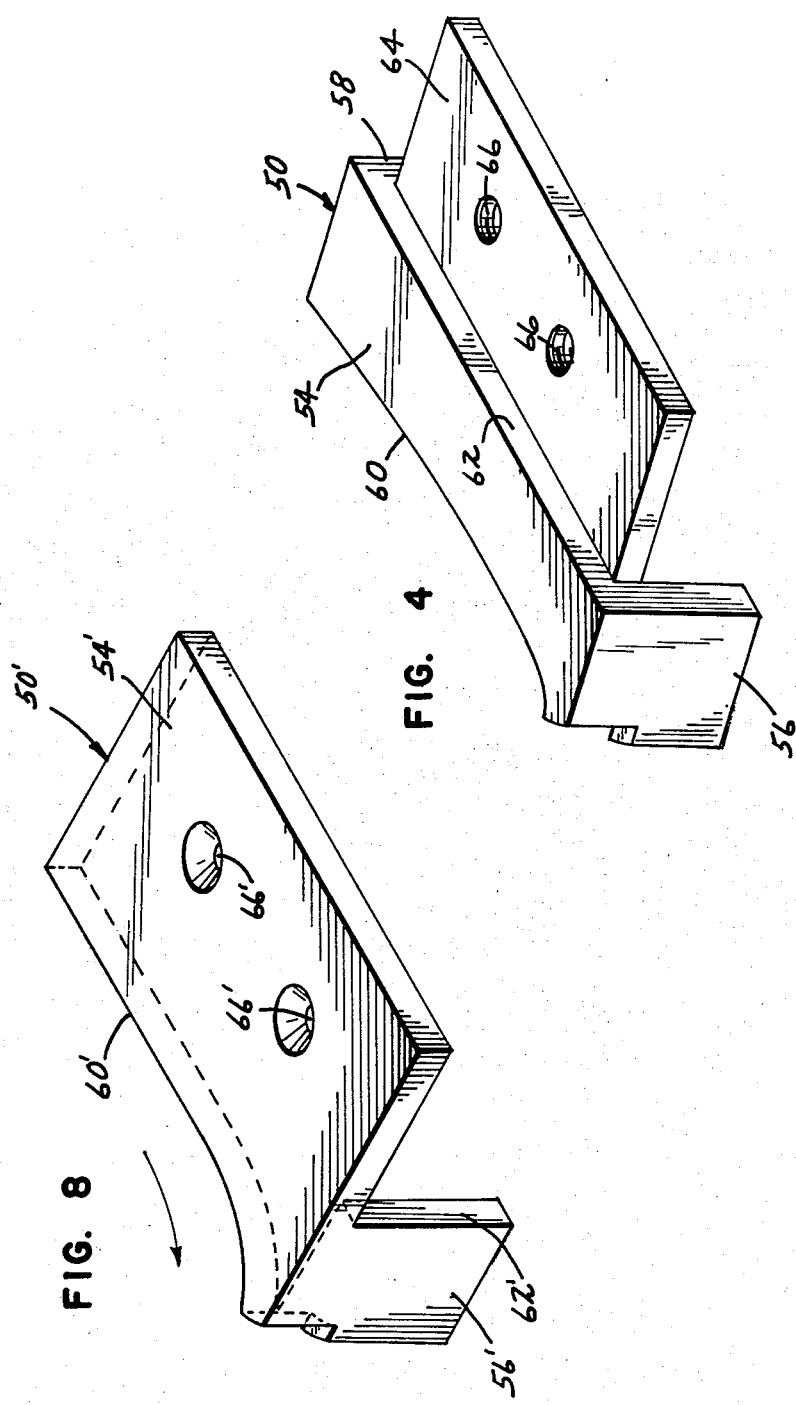

MOLDING CURVATURE TEMPLATE FIXTURE

FIELD OF THE INVENTION

This invention relates to a fixture which is both a work holder and template for use with a portable router and, more particularly, to a device which both holds a strip of molding and provides a template for a portable router to follow to shape an end of the strip of molding substantially similar to the cross-sectional shape of the shaped side of the molding.

BACKGROUND OF THE INVENTION

Various types of devices designed for use with a cutting tool to cut cabinet joints or to shape various pieces of wood have been known. Some of these various fixtures have included clamping devices for holding pieces of wood. Several of the fixtures have included some form of a template for a router to follow in order to provide a surface design or to form certain cuts for an appropriate joint.

The most commonly known device is a miter box. One design for a miter box includes a flat bottom support with a wall rising vertically upward from the support. A handsaw is adjustably supported with respect to both the wall and the bottom support. The handsaw is ordinarily perpendicular to the bottom support and may be fixed at any of a number of different angles relative to the wall. When a strip of molding or other piece of wood is clamped or otherwise held firmly to the bottom support and adjacent to the wall, a 45 degree or other angular cut may be made in the molding or piece of wood. The miter box works best with short lengths of material since a measurement and cut may be made quite precisely resulting in minimal separations between adjacent strips of molding at a corner. In a room, however, where long strips of molding are used along the base of a wall, it is very difficult to make precise measurements, and, consequently, there are often gaps between strips of molding which meet at corners.

There are no known fixtures which are commonly used in combination with a router to cut or shape the end of a strip of molding. Most fixtures for use with a router are intended as an aid in surface shaping a piece of wood or in forming the ends of pieces of wood for mating in the construction of a cabinet. For example, U.S. Pat. No. 3,450,001 shows a work holder for holding thin sheets of rigid material to be longitudinally cut or grooved by a router. U.S. Pat. No. 3,878,875 shows a fixture for clamping and holding orthogonally disposed work pieces and for guiding a cutting tool to make a dovetail joint. U.S. Pat. No. 3,109,466 discloses a fixture including several clamping devices for holding both a working template and the wood piece to be shaped or cut. The primary purpose of the fixture is to cut any of several cabinet joints. U.S. Pat. No. 3,442,309 shows a combination template, work support and guide for a router, but it requires accessory attachments to the router, as well as the proper interaction of a number of parts.

There is a distinct need for a simple fixture for use with a router which holds a strip of molding and shapes its end to a shape other than a straight cut. This is particularly the case in the construction industry where the commonly available miter box requires time consuming precise measurements to avoid gaps between adjacent strips of molding in a room. The only known alternative to using a miter box is to hand form molding ends, a process at least as time consuming as using a miter box.

SUMMARY OF THE INVENTION

The present invention is used for guiding a cutting tool to shape an end of a strip of molding. The molding includes a shaped side with a longitudinally-uniform, contoured, cross-sectional shape. The present invention is comprised of means for supporting the molding, means for holding the molding to the molding support means, means for supporting the cutting tool with respect to the molding support means, and means for guiding the cutting tool along the tool support means causing the cutting tool to shape an end of the molding to be substantially similar to the cross-sectional shape of the shaped side of the molding.

In a preferred embodiment, the fixture includes a box-section frame with at least one end open for insertion of a strip of molding. Near the longitudinal middle of the frame there is a first lateral slot in the top and in both side walls. There is a plurality of additional lateral slots approximately equally spaced between the first slot and the end of the frame opposite the insertion end. Except for the first slot, the side of each slot which faces away from the insertion end of the frame is used as a guiding surface for a portable router. The first slot is available for insert accessories which provide guiding surfaces of a non-standard molding shape. The slot farthest from the insertion end of the frame has a straight guiding surface. The other slots have guiding surfaces which have a shape substantially similar to the cross-sectional shape of the shaped side of molding strips which are the most common to the construction industry. A frame sidewall supports the molding to prevent chipping, splitting and the like as the router completes a cut. A clamping mechanism is located between the insertion end of the frame and the first slot. The clamping mechanism presses downward from the top of the frame and holds the molding firmly against the bottom adjacent a sidewall.

The fixture is used by inserting a strip of molding in the insertion end of the frame and positioning it on a wood slab on the bottom of the frame adjacent a sidewall. The guiding surface to be used is selected. The guiding surface which most nearly matches the cross-sectional shape of the shaped side of the molding should be selected. If the molding has a non-standard shape, an insert must be fastened to the frame to provide an appropriate guiding surface at the first slot. The molding is inserted so the end to be cut protrudes somewhat past an imaginary vertical surface extending downward from the guiding surface to be used in cutting the molding. The clamping mechanism is tightened against the molding to hold it firmly in place. A portable router is placed on the top of the fixture and guided along the guiding surface so as to shape with its cutting portion the end of the molding strip. The newly shaped end of the molding is the same as the shape of the guiding surface which was used and is substantially similar to the cross-sectional shape of the shaped side of the molding.

The fixture is most useful in conjunction with preparing strips of molding for installation along the floor or ceiling of a room. Proceeding, for example, in a counter-clockwise fashion, it is preferable to begin at a door frame and measure the length of the wall between the door frame and the corner of the room. Using the straight guiding surface of the fixture to square off both ends, the molding is cut to the measured length. Next, the length of the wall to be provided with molding adjacent the wall first measured is measured. Using the guiding surface most nearly matching the cross-sectional shape of the shaped side of the molding, the right end of the molding when viewing the molding from its shaped side with its bottom side down is cut. Then, changing ends and using the straight guiding surface of the fixture, the molding is cut to the measured length. Each of these steps are repeated to cut and shape all the necessary strips of molding needed to proceed around the room to the side of the door frame opposite the starting side. If another door or other barrier is encountered, the procedure is repeated from the beginning. The shaped end of the molding always fits over the square end of the perpendicularly adjacent strip of molding. The method is particularly advantageous since even if a strip of molding is cut somewhat short, there is no visible gap at a corner since the shaped end of the one strip covers any gap between the wall and the square end of the other strip. Each strip of molding appears to be accurate in length and joined with quality workmanship. Use of the fixture and the indicated method saves considerable time over prior miter box cutting and hand forming.

Use of the fixture results in the further advantage of eliminating the need for hand sanding the ends of the molding strips since the fixture supports the molding along the bottom and at the point where the router bit completes its cut. In addition, the square end of the molding strip is not visible after installation, and the cut of the shaped end is generally completed in the direction of the grain of the wood, thus minimizing the likelihood of chipping.

Although the invention is discussed primarily as it relates to the construction industry, it is understood that there are many other areas of advantageous application, including making door stops and framing pictures.

For a better understanding of the invention, its advantages, and objects attained by its use, reference should be had to the drawings which form a further part hereof, and to the accompanying descriptive matter in which there are illustrated and described preferred and other embodiments of the invention.

BRIEF DESCRIPTION OF THE DRAWINGS

FIG. 1 is a side elevational view of the invention;

FIG. 2 is a top plan view of the invention;

FIG. 3 is a cross-sectional view of an insert as installed, taken along line 3—3 of FIG. 2;

FIG. 4 is a perspective view of the insert which is shown installed in FIGS. 1-3;

FIG. 8 is a perspective view of the alternate embodiment of the insert shown installed in FIGS. 5-7.

DESCRIPTION OF THE PREFERRED EMBODIMENTS

Figure 5:
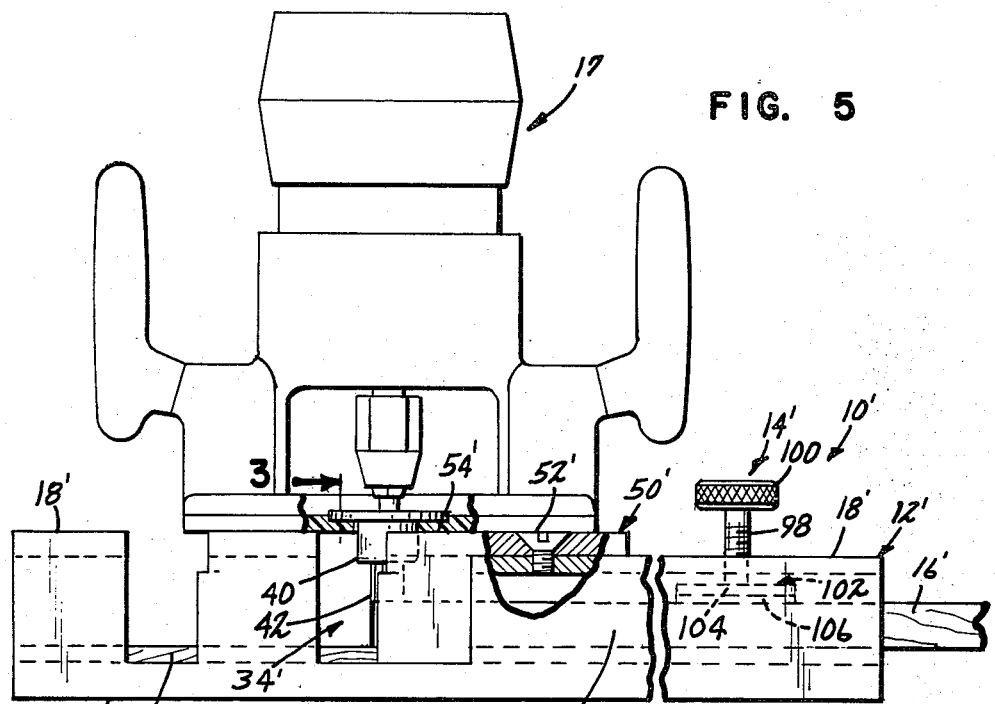
FIG. 5 is a side elevational view of an alternate embodiment of the invention and a portable router.

Referring now to the drawings wherein like reference numerals designate identical or corresponding parts throughout the several views, and more particularly to FIGS. 1 and 2, a molding curvature template fixture is designated generally as 10.

In a preferred embodiment, fixture 10 is comprised of a frame 12 with several variously shaped lateral slots 26, 28, 30, 32, 34 and having an attached clamping mechanism 14. Although five slots are indicated in FIGS. 1 and 2, there may be more or fewer slots as well. Frame 12 functions both as a support for the strip of molding 16 to be cut and as a support for the cutting tool, preferably a portable router 17 (see FIG. 5). Frame 12 is comprised preferably of either a standard square tube or a plurality of plates fastened by welding or other means in a rectangular box-section shape. Frame 12 has a top plate 18, a bottom plate 20, and sidewall plates 22 and 23. A wood bottom 24 rests on bottom plate 20 and extends the length of frame 12 throughout the space between sidewalls 22 and 23. Wood bottom 24 provides a support material for the molding 16 which is not harmful to the bottom of the cutting surface of the router bit. Wood bottom 24 is preferably replaced after repeated use when its upper surface becomes raggedly grooved from contact with the router bit so it no longer can provide sufficient bottom support for molding 16. The width of the hollow space in frame 12 is sufficient to accomodate the width of any strip of molding which may be cut utilizing fixture 10. The height of the hollow space in frame 12 is sufficient to allow the implacement of wood bottom 24 and any strip of molding 16 which may be cut in fixture 10. In addition, molding 16 must be sufficiently spaced below top 18 so when the router is supported by top 18, the cutting edge of the router bit is in proper alignment with molding 16. Frame 12 is sufficiently long to accommodate lateral slots 26, 28, 30, 32, 34 and clamping mechanism 14. Molding 16 is inserted in the end 19 of frame 12 nearest clamping mechanism 14.

Frame 12 has several variously shaped lateral slots 26, 28, 30, 32, 34 in its top 18 and sidewalls 22 and 23. Each slot has a similar configuration except for the one edge used as a guiding surface for the router. Looking at slot 28 as an example, guiding surface 36 is the edge which faces away from the molding insertion end 19 of frame 12. Guiding surface 36 has a substantially similar shape as the cross-sectional shape of the shaped side of a commonly used molding in the construction industry. Oppositely disposed slot edge 38 is ordinarily straight. Slot 28 is sufficiently wide to allow a router bit to be inserted or extracted along any portion of slot 28. At the same time slot 28 is sufficiently narrow so a router may be supported on both sides of slot 28 as the router is guided along guiding surface 36. Slot 28 has sufficient depth in sidewalls 22 and 23 to extend somewhat beyond the lowermost point on a router bit. The part of guiding surface 36 simulating the lower portion of the shaped side of a strip of molding is adjacent sidewall 23. The width of slot 28 in sidewall 23 is the same as the width of slot 28 in top 18 at the interaction of top 18 and sidewall 23. In sidewall 22, slot 28 has two different widths. The upper portion of slot 28 in sidewall 22 is the same as the width of slot 28 in top 18 at the intersection of top 18 and sidewall 22. The lower portion of slot 28 in sidewall 22 is narrower than the upper portion by the difference between the radius of guide bushing 40 and the cutting portion of router bit 42 (see FIG. 5). The extension surface 44 of guiding surface 36 has the indicated step discontinuity while the extension surface 46 of surface 38 is straight. Slot 28 in sidewall 22 narrows at a point somewhat below the bottom of guide bushing 40.

The guiding surface 48 of slot 26, the slot farthest from the molding insertion end 19, is straight and substantially perpendicular to sidewalls 22 and 23. Guiding surface 48 is used in conjunction with a router to square off the ends of a strip of molding.

The guiding surface side of slot 34, the slot nearest the molding insertion end 19, is defined by an insert 50 attached to frame 12 with screws 52. Before the attachment of insert 50, both sides of slot 34 in top 18 and sidewalls 22 and 23 of frame 12 are straight. Slot 34 is sufficiently wide so that even after the attachment of insert 50, a router bit may be inserted or extracted along any portion of slot 34. As shown in FIG. 4, insert 50 has a top plate 54 and sidewall plates 56 and 58. One side edge 60 of top 54 and sidewalls 56 and 58 is shaped similar to the edge of slot 28 which defines a guiding surface for a router, except the guiding surface 60 of insert 50 is substantially similar to the cross-sectional shape of the shaped side of a non-standard strip of construction molding. The side 62 of insert 50 opposite from guiding surface 60 is straight. A connecting plate 64 is fastened to the bottom of top 54 and extends beyond surface 62. The extended portion of connecting plate 64 includes two spaced-apart threaded holes 66 which correspond with similar holes in top 18 of frame 12 for accepting screws 52. When insert 54 is attached to frame 12 the upper surface of top 54 of insert 50 lies in the same plane as the upper surface of top 18 of frame 12.

A clamping mechanism 14 is located between insert 50 and the insertion end 19 of frame 12. The device shown in FIGS. 1 and 2 as clamping mechanism 14 has a frame 68 attached to the top 18 of frame 12 with screws 70. The frame 68 has a plate 72 for attachment with screws 70 to top 18 and has two spaced-apart plates 74 extending perpendicularly from it to support other components. Connecting link 76 is pivotally attached at one point 78 to a lower portion of plates 74, while connecting link 80 is pivotally attached at point 82 to an upper portion of plates 74. With handle 84 in a position substantially parallel to plate 72, handle 84 is pivotally attached at a lower portion point 86 of its attachment end to the unattached end of connecting link 76. Handle 84 is pivotally attached at a point 88 in an upper portion of the attachment end of handle 84 to the end of connecting link 80 which is unattached to plates 74. Lever 90 is formed integrally with lever 80 and extends outwardly from plates 74 in a direction opposite handle 84 when clamping mechanism 14 is in its clamping position. A threaded rod 92 extends perpendicularly downward from lever 90 and is adjustably attached to it with nuts 94. A pad 96 is fastened at the free end of rod 92. Clamping mechanism 14 is placed in its clamping position when handle 84 is moved downward causing connecting link 76 to pivot about point 78 and 86 and pass from the handle 84 side of the vertical to the lever 90 side of the vertical. As handle 84 is moving downward, connecting link 80 is pivoting about point 82. Handle 84 causes point 88 to rotate upward about point 82 causing lever 90 to pivot downward and press pad 96 against molding 16. With rod 92 properly adjusted, clamping mechanism 14 firmly holds molding 16 in position when connecting link 76 passes over vertical center as hereinbefore described.

An appropriately sized and located opening 98 in top 18 allows rod 92 and pad 96 to move through top 18 during the operation of clamping mechanism 14.

An alternate embodiment of the molding curvature template fixture is generally designated as 10' in FIG. 5. Fixture 10' has a number of alternate parts which will be identified by new numerals. Parts of fixture 10' which are similar to fixture 10 will be indicated as primed numerals. Frame 12' of fixture 10' is similar to frame 12 of fixture 10 except upper surface 18' on the same side of insert slot 34' as the insertion end 19' of frame 12' is lower than the upper surface of 18' on the other side of insert slot 34'. The indicated difference in height of top 18' is approximately equal to the thickness of top plate 54' of the alternate embodiment of insert 50' (see FIG. 8). Insert 50' is similar to insert 50 except connecting plate 64 in insert 50 is essentially an extension of top 54' in insert 50'. Instead of connecting plate 64 fitting beneath top 18 of frame 12, top 54' of insert 50' fits on top of top 18' of frame 12' so that the upper surface of top 54' is in approximately the same plane as the higher of the two upper surfaces of top 18'. Thus, as router 17 is guided along the guiding surface 60' of insert 50', it is supported by surfaces on either side of slot 34' which are approximately in the same plane.

Clamping mechanism 14' is comprised of a threaded rod 98 having a circular grip 100 fastened at its upper end and a circular pad 102 fastened at its lower end. Grip 100 is a plate of sufficient thickness to be easily grasped. Pad 102 is comprised of a plate 104 having a flexible material 106 on the surface which contacts molding 16'. Pad 102 has sufficient diameter so that when it is pressed against molding 16' as clamping mechanism 14' is screwed downward, pad 102 does not scar the surface of molding 16'.

Fixture 10 is most commonly used in the construction industry as an aid to cutting and shaping the ends of strips of molding for installation around the walls of a room, usually in proximity with the floor or with the ceiling. It is to be understood, however, that fixture 10 may also be used very advantageously in other applications such as making door stops and framing pictures.

Figure 6:
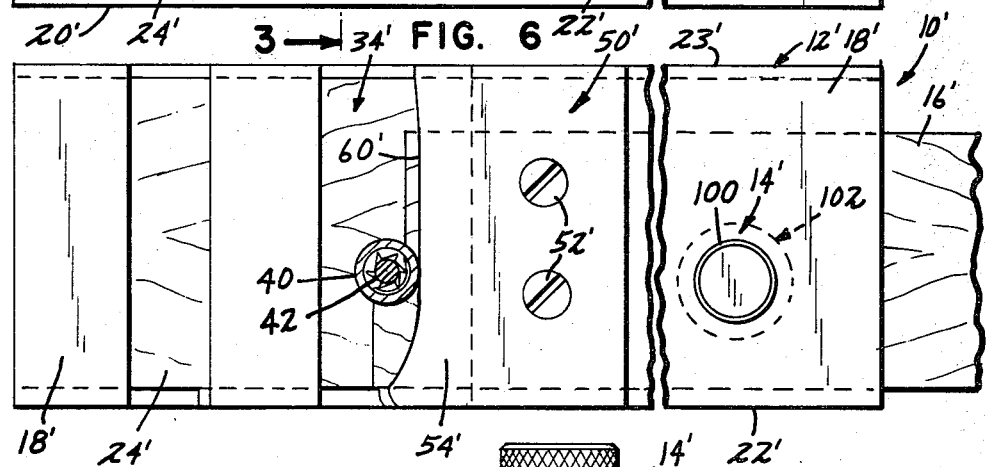
FIG. 6 is a top plan view of the alternate embodiment with most of the router removed.
Figure 7:
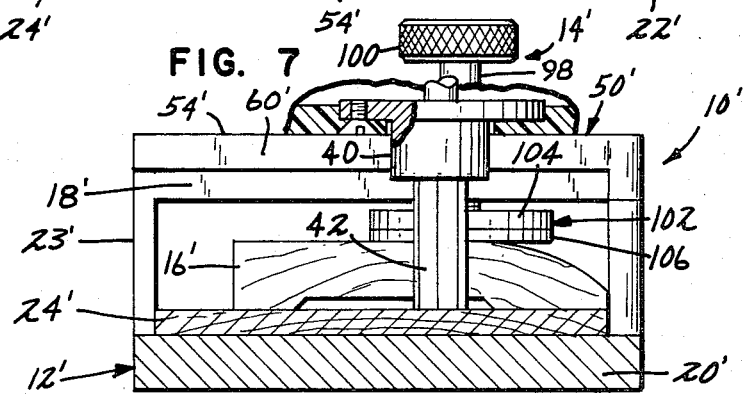
FIG. 7 is a cross-sectional view of the invention as a router guide bushing follows along the guide surface of an insert, taken along line 7—7 of FIG. 5.

To use, it is first necessary to identify the slot which is to be used to provide a quiding surface. It is desirable to choose a guiding surface which is substantially similar to the cross-sectional shape of the shaped side of the molding 16 to be cut. If none of the slots 28, 30, 32 satisfy the criteria, then an insert 50 having the required guiding surface shape must be installed on frame 12 with screws 52. Assuming, for example, that slot 28 is to be used, molding 16 is inserted in the insertion end 19 of frame 12 so the upper portion of molding 16 is adjacent sidewall 22 and the bottom of molding 16 is facing sidewall 23. The end of molding 16 is positioned to extend slightly beyond the lower portion of surface 44 of sidewall 22. Handle 84 of clamping mechanism 14 is moved downward causing pad 96 to press against and firmly hold molding 16 against wood bottom 24. A router 17 is moved through slot 28 from sidewall 23 to sidewall 22 with guide bushing 40 pressed against guiding surface 36 (see FIGS. 5-7). Wood bottom 24 and surface 44 of sidewall 22 prevent chipping, splintering and the like of molding 16 as router 17 makes the cut. With the cut completed, clamping mechanism 14 is released by moving handle 84 upward.

To prepare strips of molding for installation in a room, the following procedure is preferable. Starting at a door frame or other barrier and moving, for example, counter-clockwise around the room, the distance along a wall between the door frame and the next wall must be determined. Using slot 26 in the manner previously described, the first piece of molding is cut to length with both ends straight. The length for the next piece of molding must then be determined. The right end of the molding as viewed from the shaped side of the molding with the bottom of the molding down is shaped using the appropriate slot in fixture 10 according to the method previously described. The appropriate slot is the one having a guiding surface substantially similar to the cross-sectional shape of the shaped side of the molding. The left end of the molding is cut straight using slot 26 such that the measured length required for the strip of molding is obtained. The previously described steps are repeated as required to complete the molding installation.

The alternate embodiment fixture 10' is used in a similar manner.

Although numerous characteristics and advantages of the invention have been set forth in the foregoing description, together with details of the structure and function of the invention, it is to be understood that the disclosure is illustrative only. Any changes made, especially in matters of shape, size and arrangement, to the full extent extended by the general meaning of the terms of which the appended claims are expressed, are within the principle of the invention.

What is claimed is:

1. A fixture for guiding a cutting tool to shape an end of a strip of molding, said molding including a shaped side with a longitudinally-uniform, contoured cross-sectional shape, said fixture comprising;
   means for supporting said molding and said cutting tool, said molding and cutting tool supporting means including a box-section frame having a bottom and a top with sidewalls extending therebetween, said frame having an open insertion end, whereby said molding may be inserted into said frame and supported on the bottom adjacent a sidewall with said cutting tool supported by the top;
   means for holding said molding to said molding and tool supporting means; and
   means for guiding said cutting tool along said molding and tool supporting means causing said cutting tool to shape an end of said molding to be substantially similar to the cross-sectional shape of the shaped side of said molding.

2. A fixture in accordance with claim 1 wherein said tool guiding means includes a guiding surface extending laterally with respect to the top of said frame and facing in a direction away from the insertion end of said frame, said guiding surface shaped substantially similar to the cross-sectional shape of the shaped side of said molding, whereby said cutting tool may be guided along said guiding surface thereby allowing a cutting portion of said tool to shape the end of said strip of molding.

3. A fixture in accordance with claim 1 wherein said tool guiding means includes the top of said frame being separated by a lateral slot into an upper portion and a lower portion, the upper portion having an upper surface raised relative to an upper surface of the lower portion, the lower portion being located between the slot and the open insertion end of said frame, and wherein said tool guiding means further includes an insert having a plate for attachment to the upper surface of the lower portion of said top and having an upper surface lying in approximately the same plane as the upper surface of the upper portion of said top, said insert having a surface extending into the slot and shaped substantially similar to the cross-sectional shape of the shaped side of said molding, whereby said cutting tool may rest on the upper surfaces of said top and said insert plate and be guided along the shaped surface of the insert thereby allowing a cutting portion of said tool to shape the end of said strip of molding.

4. A fixture in accordance with claim 1 wherein the top of said frame has a lateral slot and said tool guiding means includes an insert for attachment to the top of said frame, the top of said frame and said insert having upper surfaces lying in approximately the same plane, said insert having a surface extending into the slot and shaped substantially similar to the cross-sectional shape of the shaped side of said molding, whereby said cutting tool may rest on the upper surfaces of said top and said insert and be guided along the shaped surface of the insert thereby allowing a cutting portion of said tool to shape the end of said strip of molding.

5. A fixture for guiding a cutting tool to shape one or more ends of a strip of molding, said molding including a shaped side having a longitudinally-uniform, contoured cross-sectional shape, said fixture comprising:
   means for supporting said molding and preventing unanticipated chipping of said molding caused by said cutting tool;
   means for supporting said cutting tool with respect to said molding support means;
   first means for guiding said cutting tool along said tool support means causing said cutting tool to shape an end of said molding to be substantially similar to the cross-sectional shape of the shaped side of said molding;
   second means for guiding said cutting tool along said tool support means causing said cutting tool to make a straight cut approximately perpendicular to the sides of said molding across an end of said molding; and
   means for holding said molding fixed relative to said molding support means and one of said first and second guide means.

6. A fixture in accordance with claim 5 wherein said molding support means and said tool support means are comprised of a box-section frame having bottom and top plates with sidewall plates extending therebetween, said frame having an open insertion end, whereby said molding may be inserted into said frame and supported on the bottom plate adjacent a sidewall plate with said cutting tool supported by the top plate.

7. A fixture in accordance with claim 6 wherein said first tool guiding means includes a first guiding surface extending laterally with respect to the top plate of said frame and facing in a direction away from the insertion end of said frame, said first guiding surface shaped substantially similar to the cross-sectional shape of the shaped side of said molding, whereby said cutting tool may be guided along said first guiding surface thereby allowing a cutting portion of said tool to shape the end of said strip of molding.

8. A fixture in accordance with claim 6 wherein said first tool guiding means includes the top plate of said frame being separated by a first lateral slot into an upper portion and a lower portion, the upper portion having an upper surface raised relative to an upper surface of the lower portion, the lower portion being located between the first slot and the open insertion end of said frame, and wherein said first tool guiding means further includes an insert having a plate for attachment to the upper surface of the lower portion of said top plate and having an upper surface lying in approximately the same plane as the upper surface of the upper portion of said top plate, said insert having a first guiding surface extending into the first slot and shaped substantially similar to the cross-sectional shape of the shaped side of said molding, whereby said cutting tool may rest on the upper surfaces of said top plate and said insert and be guided along the shaped surface of said insert thereby allowing a cutting portion of said tool to shape the end of said strip of molding.

9. A fixture in accordance with claim 6 wherein the top plate of said frame has a first lateral slot and said first tool guiding means includes an insert for attachment to the top plate of said frame, the top plate of said frame and said insert having upper surfaces lying in approximately the same plane, said insert having a first guiding surface extending into the first slot and shaped substantially similar to the cross-sectional shape of the shaped side of said molding, whereby said cutting tool may rest on the upper surfaces of said top plate and said insert and be guided along the shaped surface of the insert thereby allowing a cutting portion of said tool to shape the end of said strip of molding.

10. A fixture in accordance with claims 7, 8 or 9 wherein said second tool guiding means includes a second guiding surface extending laterally with respect to the top plate of said frame and facing in a direction away from the insertion end of said frame, said second guiding surface being straight and approximately perpendicular to the sidewalls of said frame, whereby said cutting tool may be guided along the straight edge thereby allowing a cutting portion of said tool to make a straight cut approximately perpendicular to the sides of said molding across an end of said molding.

11. A fixture in accordance with claims 2, 6 or 8 wherein said clamping means includes a threaded rod, a means for gripping said rod at one end, and a pad at another end of said rod, said rod being threaded through an opening in the top plate of said frame, whereby said rod may be screwed to press the pad on said rod against said molding thereby clamping said molding between the pad and the bottom plate of said frame.

12. A fixture used in combination with a portable router to shape end portions of strips of molding, said router having a cutting accessory mounted to rotate about an axis, said molding strips having a shaped side with a longitudinally-uniform, contoured cross-sectional shape, said fixture comprising:

a longitudinally-extending, box-section frame having a bottom, a top and two sides, said frame having an open end for insertion of a strip of molding, said frame for supporting a strip of molding with said bottom adjacent one said side and for supporting said router with said top;

a plurality of guiding surface means for guiding said router, each said guiding surface means including a guiding surface, one of said guiding surfaces being straight, flat and substantially perpendicular to the sides of said frame, said straight guiding surface for guiding said router to make a straight cut approximately perpendicular to the sides of said molding across an end of said molding, all other said guiding surfaces being shaped differently from each other and substantially similar to the cross-sectional shape of the different shaped sides of different strips of molding the ends of which may be shaped like said guiding surfaces by said router being guided along said guiding surfaces, said guiding surfaces extending laterally with respect to the top of said frame and facing in a direction away from the insertion end of said frame;

means for clamping a strip of molding within said frame, said clamping means located between the insertion end of said frame and said plurality of guiding surface means; and means for supporting one side of said molding to prevent chipping of said molding, said supporting means providing support perpendicular to the axis of said router.

13. A fixture in accordance with claim 12 wherein one of said guiding surface means includes an insert for attachment to the top of said frame, the top of said frame having an upper surface and said insert having an upper surface lying in approximately the same plane, said insert having a guiding surface shaped substantially similar to the cross-sectional shape of the shaped side of a strip of molding, whereby said router may be guided along said guiding surface thereby allowing a cutting portion of said router to shape the end of said strip of molding substantially similar to the cross-sectional shape of the shaped side of said strip of molding.

14. The method of abutting first and second strips of molding to form a substantially right angle corner, each said strip of molding having a similar longitudinally-uniform, contoured cross-sectional shaped side and a bottom side, said strips of molding having first ends at similar ends when viewing the shaped side of said strips with the bottom sides downward and second ends opposite said first ends, said method comprising the steps of:

cutting the first end of said second molding strip to be flat and substantially perpendicular to the shaped side of said second molding strip;

shaping the second end of said first molding strip substantially similar to the cross-sectional shape of the shaped side of said molding strips; and abutting the second end of said first molding strip to the shaped side of said second molding strip near the first end of said second molding strip.

15. The method of preparing a strip of molding for installation along a first wall and between a first barrier and one of a second barrier and a corner with a second wall, said strip of molding having a shaped side with a longitudinally-uniform, contoured cross-sectional shape, said method comprising the steps of:

cutting said strip of molding to the same length as the distance between said first barrier and one of said second barrier and the corner of said second wall, said strip of molding having flat ends substantially perpendicular to the shaped side of said strip of molding; and shaping, unless said strip of molding is cut to the same length as the distance between said first barrier and said second barrier, the end of said strip of molding opposite said first barrier when the shaped side of said strip of molding faces away from said first wall substantially similar to the cross-sectional shape of the shaped side of said strip of molding;

whereby repeated use of said method provides strips of molding for installation in a room.

* * * * *

UNITED STATES PATENT AND TRADEMARK OFFICE
CERTIFICATE OF CORRECTION

PATENT NO. : 4,356,849

DATED : November 2, 1982

INVENTOR(S) : Donald L. Fredrickson

It is certified that error appears in the above—identified patent and that said Letters Patent is hereby corrected as shown below:

Column 4, line 56, delete "interaction" and insert therefor --intersection--.

Signed and Sealed this

Eighth Day of March 1983

[SEAL]

Attest:

GERALD J. MOSSINGHOFF

Attesting Officer — Commissioner of Patents and Trademarks